United States Patent [19]
Pfeffer et al.

[11] Patent Number: 5,210,860
[45] Date of Patent: May 11, 1993

[54] INTELLIGENT DISK ARRAY CONTROLLER

[75] Inventors: Scott M. Pfeffer; Stephen M. Schultz, both of Houston, Tex.

[73] Assignee: Compaq Computer Corporation, Houston, Tex.

[21] Appl. No.: 556,646

[22] Filed: Jul. 20, 1990

[51] Int. Cl.⁵ .............................................. G11C 29/00
[52] U.S. Cl. .................................. 395/575; 371/40.1; 371/21.1
[58] Field of Search ...................... 364/268.5; 371/21.1, 371/21.2, 10.1, 40.1; 360/77.04; 369/534; 395/575

[56] References Cited

U.S. PATENT DOCUMENTS

| | | | |
|---|---|---|---|
| 3,771,143 | 11/1973 | Taylor | 364/200 |
| 4,384,348 | 5/1983 | Nozaki | 371/21.2 X |
| 4,630,269 | 12/1986 | Gershenson et al. | 371/24 |
| 4,669,082 | 5/1987 | Tilghman et al. | 371/21.1 |
| 4,724,531 | 2/1988 | Angleton et al. | 371/21.2 X |
| 4,775,978 | 10/1988 | Hartness | 371/38 |

OTHER PUBLICATIONS

M. Schulze, "Considerations in the Design of a RAID Prototype," Aug. 1988, Report No. UCB/CSD 88/448, University of California Berkeley.
G. Gibson, L. Hellerstein, R. Karp, R. Katz and D. Patterson, "Coding Techniques for Handling Failures in Large Disk Arrays," Dec. 1988, Report No. UCB/CSD 88/477, University of California Berkeley.
D. Patterson, G. Gibson and R. Katz, "A Case Study for Redundant Arrays of Inexpensive Disks (RAID)," Dec. 1987, Report No. UCB/CSD 87/391, University of California Berkeley.

*Primary Examiner*—Robert W. Beausoliel
*Assistant Examiner*—Allen M. Lo
*Attorney, Agent, or Firm*—Pravel, Gambrell, Hewitt, Kimball & Krieger

[57] ABSTRACT

A method for performing background disk sector analysis for drives, including drives dedicated to redundancy and/or fault recovery techniques, in an intelligent, microprocessor based disk array. The method directs the microprocessor to wait a specified time and test for disk activity. In the absence of disk activity, the disk controller is directed to generate a read request for a disk memory location within the array. A return code following the array is checked to determine if the read failed, indicating a disk drive media failure. The disk controller is then notified if a failure occurs. The processor again checks for disk array activity and in the absence of activity issues a read request for successive locations within the array, thereby reading all disk memory locations within the array.

9 Claims, 14 Drawing Sheets

INTELLIGENT DISK ARRAY CONTROLLER

FIELD OF THE INVENTION

The present invention relates to the control of disk drives within a computer system and more particularly to a method for carrying out disk drive sector analysis in a background mode in an intelligent mass storage disk drive array subsystem for a personal computer.

DESCRIPTION OF THE RELATED ART

Microprocessors and the personal computers which utilize them have become more powerful over the recent years. Currently available personal computers have capabilities easily exceeding mainframe computers of 20 to 30 years ago and approach capabilities of many mainframe and minicomputers currently manufactured. Microprocessors having word sizes of 32 bits wide are now widely available, whereas in the past, 8 bits was conventional and 16 bits was common.

Personal computer systems have developed over the years and new uses are being discovered daily. The uses are varied and, as a result, have different requirements for various subsystems forming a complete computer system. Because of production volume requirements and resultant economics of scale it is desirable that as many common features as possible are combined into high volume units. This has happened in the personal computer area by developing a basic system unit which generally contains a power supply, provisions for physically mounting the various mass storage devices and a system board, which in turn incorporates a microprocessor, microprocessor related circuitry, connectors for receiving circuit boards containing other subsystems, circuitry related to interfacing the circuit boards to the microprocessor and memory. The use of connectors and interchangeable circuit boards allows subsystems of the desired capability for each computer system to be easily incorporated into the computer system. The use of interchangeable circuit boards necessitated the development of an interface or bus standard so that the subsystems could be easily designed and problems would not result from incompatible decisions by the system unit designers and the interchangeable circuit board designers.

The use of interchangeable circuit boards and an interface standard, commonly called a bus specification because the various signals are provided to all the connectors over a bus, was incorporated into the original International Business Machines Corporations (IBM) personal computer, the IBM PC. The IBM PC utilized in Intel Corporation 8088 as the microprocessor. The 8088 has an 8 bit, or 1 byte, external data interface but operates on a 16 bit word internally. The 8088 has 20 address lines, which means that it can directly address a maximum of 1 Mbyte of memory. In addition, the memory components available for incorporation in the original IBM PC were relatively slow and expensive as compared to current components. The various subsystems such as video output units or mass storage units, were not complex and also had relatively low performance levels because of the relative simplicity of the devices available at a reasonable costs at that time.

With these various factors and component choices in mind, an interface standard was developed and used in the IBM PC. The standard utilized 20 address lines and 8 data lines, individual lines to indicate input or output (I/O) or memory space read/write operations, and had limited availability of interrupts and direct memory access (DMA) channels. The complexity of the available components did not require greater flexibility or capabilities of the interface standard to allow the necessary operations to occur. This interface standard was satisfactory for a number of years.

As is inevitable in the computer and electronics industry, capabilities of the various components available increased dramatically. Memory component prices dropped in capacities and speeds increased. The performance rate and capacities of the mass storage subsystems increased, generally by the incorporation of hard disk units for previous floppy disk units. The video processor technology improved so that high resolution color systems were reasonably affordable. These developments all pushed the capabilities of the existing IBM PC interface standard so that the numerous limitations in the interface standard became a problem. With the introduction by Intel Corporation of 80286, IBM developed a new, more powerful personal computer called the AT. The 80286 has a 16 bit data path and 24 address lines so that it can directly address 16 Mbytes of memory. In addition, the 80286 has an increased speed of operation and can easily perform many operations which taxed 8088 performance limits.

It was desirable that the existing subsystem circuit boards be capable of being used in the new AT, so the interface standard used in the PC was utilized and extended. A new interface standard was developed, which has become known as the industry standard architecture (ISA). A second connector for each location was added to contain additional lines for the signals used in the extension. These lines included additional address and data lines to allow the use of the 24 bit addressing capability and 16 bit data transfers, additional interrupt and direct memory access lines and lines to indicate whether the subsystems circuit board was capable of using the extended features. While the address values are presented by the 80286 microprocessor relatively early in the operation cycle, the PC interface standard could not utilize the initial portions of the address availability because of different timing standards for the 8088 around which the PC interface Was designed. This limited the speed at which operations could occur because they were now limited to the interface standard memory timing specifications and could not operate at the rate available with the 80286. Therefore, the newly added address signals previous available, but the newly added signals were available at an early time in the cycle. This change in the address single timing allowed operations which utilized the extended portions of the architecture to operate faster. With a higher performance components available it became possible to have a master unit other than the system microprocessor or direct memory access controller operating the bus. However, because of the need to cooperate with circuit boards which operated under the new 16 bit standard or the old 8 bit standard, each master unit was required to understand and operate with all the possible combinations of circuit boards. This increased the complexity of the master unit and resulted in a duplication of components, because the master unit had to incorporate many of the functions and features already performed by the logic and circuitry on the system board and other master units. Additionally, the master unit was required to utilize the direct memory access controller to gain control of the bus, limiting prioritizing and the number of master units possible in a given computer system. The capabilities of components continued to increase. Memory speeds and sizes increased, mass storage units and size increased, video unit resolutions increased and Intel Corporation introduced the 80386 microprocessor. The increased capabilities of the components created a desire for the use of master units, but the performance of a master unit was limited by the ISA specification and capabilities. The 80386 could not be fully utilized because it offered the capability directly address 4 Gbytes of memory using 32 bits of address and could perform 32 bit wide data transfers, while the ISA standard allowed only 16 bits of data and 24 bits of address. The local area network (LAN) concept, where information and file stored on one computer called server and distributed to local work stations having limited or no mass storage capabilities, started becoming practical with the relatively low cost of high capability components needed for adequate servers and the low costs of the components for work stations. An extension similar to that performed in developing the ISA could be implemented to utilize the 80386's capabilities. However, this type of extension would have certain disadvantages. With the advent of the LAN concept and the high performance requirements of the server and of video graphics work stations used in computer-aided design and animation work, the need for a very high data transfer rates became critical. An extension similar to that performed in developing the ISA would not provide this capability, even if slightly shorter standard cycle times were provided, because this would still leave the performance below desired levels.

With the increased performance of computer systems, it became apparent that mass storage subsystems, such as fixed disk drives, played an increasingly important role in the transfer of data to and from the computer system. In the past few years, a new trend in mass storage subsystems has emerged for improving data transfer performance, capacity and reliability. This is generally known as a disk array subsystem. A number of reference articles on the design of disk arrays have been published in recent years. These include "Considerations in the Design of a RAID Prototype" by M. Schulze, Report No. UCB/CSD 88/448, August, 1988, Computer Science Division, University of California, Berkeley; "Coding Techniques for Handling Failures in Large Disk Arrays" by G. Gibson, L. Hellerstein, R. Karp, R. Katz and D. Patterson, Report No. UCB/CSD 88/477, December 1988, Computer Science Division, University of California Berkeley; and "A Case Study for Redundant Arrays of Inexpensive Disks (RAID)" by D. Patterson, G. Gibson, and R. Katz, presented at the June 1988 ACM SIGMOD Conference in Chicago, Ill.

One reason for wanting to build a disk array subsystem is to create a logical device that has a very high data transfer rate. This may be accomplished by ganging multiple standard disk drives together and transferring data to or from these drives to the computer system memory. If n drives are ganged together, then the effective data transfer rate is increased n times. This technique, called striping, originated in the super computing environment where the transfer of large amounts of data to and from secondary storage is a frequent requirement. With this approach, multiple physical drives may be addressed as a single logical device and may be implemented either through software or hardware.

Disk array subsystems may also be configured to provide data redundancy and/or data recovery capability.

Two data redundancy and recovery techniques have generally been used to restore data in the event of a catastrophic drive failure. One technique is the mirrored drive. A mirrored drive in effect creates a redundant data drive for each data drive. A write to a disk array utilizing the mirrored drive fault tolerance technique will result in a write to the primary data disk and a write to its mirror drive. This technique results in a minimum loss of performance in the disk array. However, there exist certain disadvantages to the use of mirrored drive fault tolerance techniques. The primary disadvantage is that this technique uses 50% of total data storage available for redundancy purposes. This results in a relatively high cost of storage per available byte.

Another technique is the use of a parity scheme which reads data blocks being written to various drives within the array and uses a known exclusive or (XOR) technique to create parity information which is written to a reserved or parity drive in the array. The advantage to this technique is that it may be used to minimize the amount of data storage dedicated to data redundancy and recovery. In an 8 drive array, the parity technique would call for one drive to be used for parity information; 12.5% of total storage is dedicated to redundancy as compared to 50% using the mirrored drive fault tolerance technique. The use of parity drive techniques decreases the cost of data storage. However, there are a number of disadvantages to the use of parity fault tolerance techniques. The primary among them is the loss of performance within the disk array as the parity drive must be updated each time a data drive is updated. The data must undergo the XOR process in order to write to the parity drive as well as writing the data to the data drives.

A second disadvantage is the use of the system processor to perform XOR parity information generation. This requires that the drive data be transferred from the drives, to a transfer buffer, to the system processor local memory to create the XOR parity information and that the data be sent back to the drives via the transfer buffer. As a result, the host system processor encounters a significant overhead in managing the generation of the XOR parity data. The use of a local processor within the disk array controller also encounters many of the same problems that a system processor would. The drive data must again go from the drives to a transfer buffer to local processor memory to generate XOR parity information and then back to the parity drive via the transfer buffer.

Related to this field of data error correction is U.S. Pat. No. 4,775,978 for a data error correction system.

Implementation of either mirror or parity fault tolerance techniques in a disk array significantly improves data redundancy and recovery capability within a disk array. However, conditions may arise which may lead to data loss within a disk array despite the implementation of mirror or parity fault tolerance techniques. These conditions may arise when disk sectors on a parity or mirror disk fail, followed by failure of corresponding disk sectors on data disks. In such instances, the data cannot be regenerated as either the mirror or parity disk has already failed and the failure not generally detected or corrected.

For example, a database application may include a number of data records which are written initially to a disk array and are read multiple times without the records being updated. During the initial write operation, the data written to the data drives is used to generate XOR parity information. The data is written to data drive sectors on data disks within the array and the corresponding XOR parity information is written to corresponding sectors on the parity drive. When a data drive fails, the data may be regenerated using the XOR parity information from the parity drive and the remaining data drives. While catastrophic drive failure may occur, the more common mode of failure for a hard disk is for one or more disk sectors on a disk track to become corrupted or unreadable. Disk sector data may also be regenerated utilizing the remaining data disks and XOR parity disk. The corresponding sectors of the remaining data disks and the parity disk may be read to regenerate the lost disk sector data. The regenerated data may then be written to a replacement disk as part of a total data disk regeneration process or the regenerated data may be remapped to new sectors on the existing disk.

In this environment, the disk controller generally will not access the parity disk unless a write to the corresponding data drive sectors occurs or unless the parity sectors must be read to generate data for one or more of the data drives. However, the parity disk is just as susceptible to disk failure as the data drives within the array. During the course of operations, sectors on the parity drive may become corrupted or fail. This failure would not normally be detected as the parity disk is not being accessed by the disk controller. Thus, the XOR parity information corresponding to sectors on the data disks may be corrupted or lost without the disk controller or the user being aware of the parity disk sector failure. Should a corresponding data drive sector subsequently become corrupted or otherwise fail, the disk array will be unable to regenerate the data despite the use of parity fault tolerance techniques.

A similar situation may occur where mirrored drive fault tolerance techniques are utilized in a disk array. As in the parity fault tolerance situation, instances will arise when a record is initially written to a data drive and is read many times without the data record being updated. The initial write request will generate a write command to the data disk and its corresponding mirror disk. Subsequent read requests will be directed by the disk controller to sectors on the data disk without reading the corresponding sectors on the mirror disk. The controller will not access the mirror disk unless a write command is issued to the data disk or the mirror disk is read to regenerate data in the event of a data disk failure.

Over time sectors on the mirror disk may become corrupted or fail. This failure will not be detected by the disk array controller or the user as the read requests will be directed to the data disk and not the mirror disk. Thus, the drive controller and user are unaware of the mirror disk failure. The disk array will be unable to regenerate data should data disk sectors subsequently become corrupted or fail if their corresponding mirror drive sectors have already become corrupted or failed.

This situation will not occur when the mirrored drive is managed using duplexed disk controllers. In a duplex environment, separate controllers are used to manage the data and mirrored drives. The initial write request will result in a write command being generated by each of the controllers to their respective drives. Subsequent read requests are also sent to both drive controllers. The operating system will accept the data from either the data or mirror disk controller based upon which controller completes the read request first. Thus, though one disk may nominally be designated as the mirror disk, it may act as the primary data disk in many instances. Additionally, if a sector on either drive goes bad, the error will be provided to the operating system because each controller must respond to the request. Thus, even if the data is used from the other drive, the error is reported.

Thus, it will be appreciated that data loss may still occur even when parity or mirror fault tolerance techniques are used.

SUMMARY OF THE INVENTION

The present invention is for use with a personal computer having a fault tolerant, intelligent disk array controller system; the controller being capable of managing the operation of an array of up to 8 standard integrated disk drives connected in drive paris without supervision by the computer system host. Specifically, the present invention is directed toward a method for performing disk surface analysis by generating read requests for all disks within an array, including parity and mirror disks, as a background task to verify disk sector integrity.

The method of the present invention is intended for use in an intelligent disk array subsystem controller having a local microprocessor operating in a multi-tasking environment. The method of the present invention initiates a background task after a predetermined time in which no disk activity takes place. The background task creates a series of read requests which are processed by the disk controller which will cause all disk sectors within the array, including any disks allocated to fault tolerance and data redundancy, to be read and therefore checked for sector integrity. The individual read requests are scheduled by the local processor and return a success or failure code indicating the integrity of the information in the sector read. The method includes a means for notifying the host processor of a read failure code so that corrective action may be taken. The present invention will continue to generate read requests in a background mode until all sectors within the disk array have been read and verified. Upon completion of reading all sectors, the present invention will proceed to begin the read verification for the entire array again. The present invention does not adversely affect disk array subsystem performance as a result of this read verification process as the background task will be inactive when the disk array subsystem is actively performing read or write operations. The background task will become active after a predetermined time after disk operations have completed and tests to determine if the disk array is still performing read or write operations. If still busy, the background task will again go inactive for the predetermined period. If the disk array is inactive, the task will resume issuing read requests for the disk array. The present invention will continue to issue read requests until all disk memory locations within the array have been verified. Following completion of this task, the present invention will again begin issuing read request for the disk array, repeating the above process.

BRIEF DESCRIPTION OF THE DRAWINGS

A better understanding of the invention can be had when the following detailed description of the preferred embodiment is considered in conjunction with the following drawings, in which.

DETAILED DESCRIPTION OF THE PREFERRED EMBODIMENT

Table of Contents

I. Computer System Overview
II. Disk Array Controller
III. Background Surface Analysis
  A. Restart Surface Analysis
  B. Surface Analysis Task
  C. Initialization of Surface Analysis
  D. Scheduler Operations
  E. Timer Function
  F. Busy Function
IV. Conclusion

I. Computer System Overview

Figure 1:
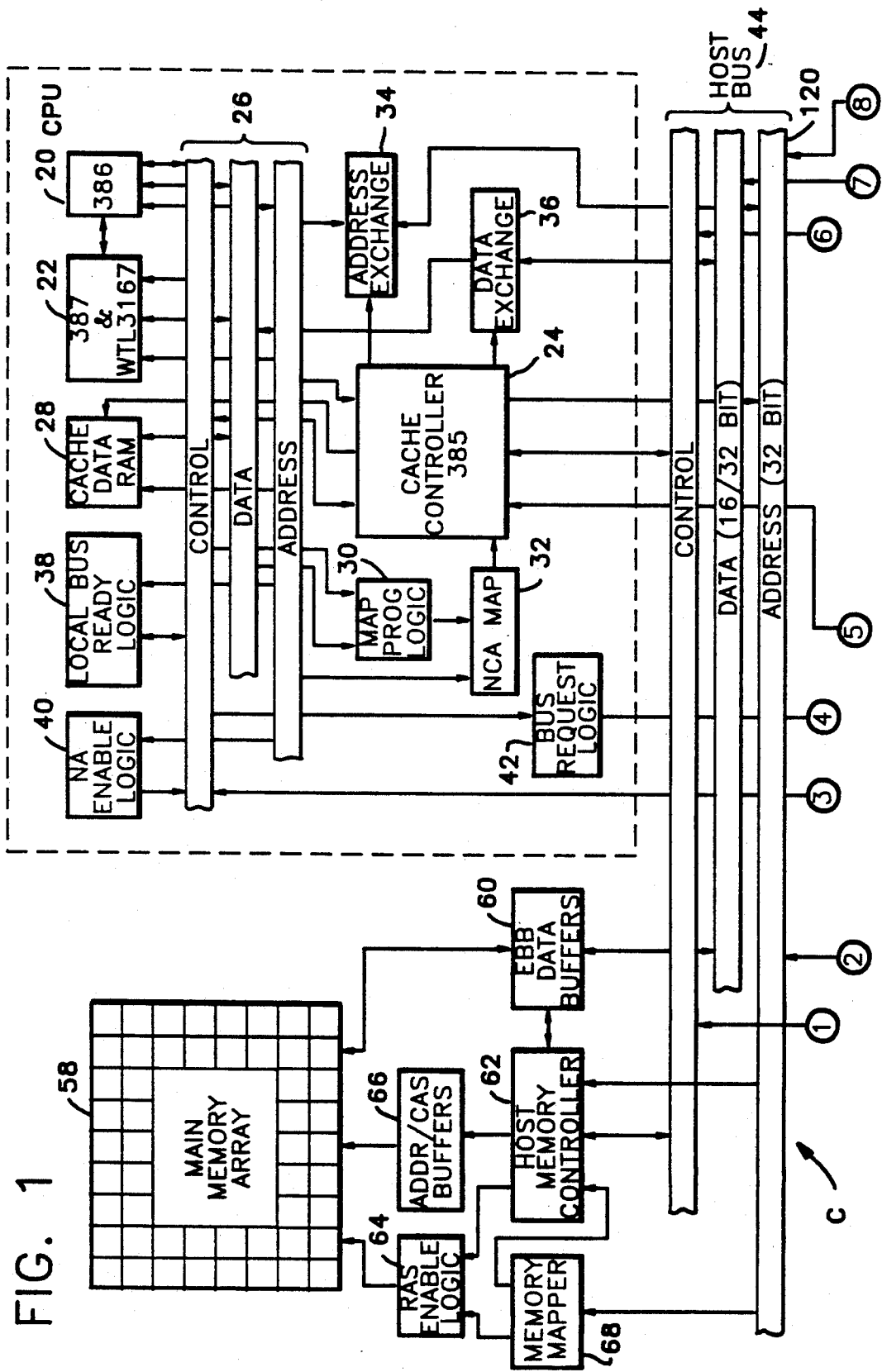
FIGS. 1, 2A-2B are a schematic block diagrams of a computer system in which the present invention may be practiced.
Figure 2A:
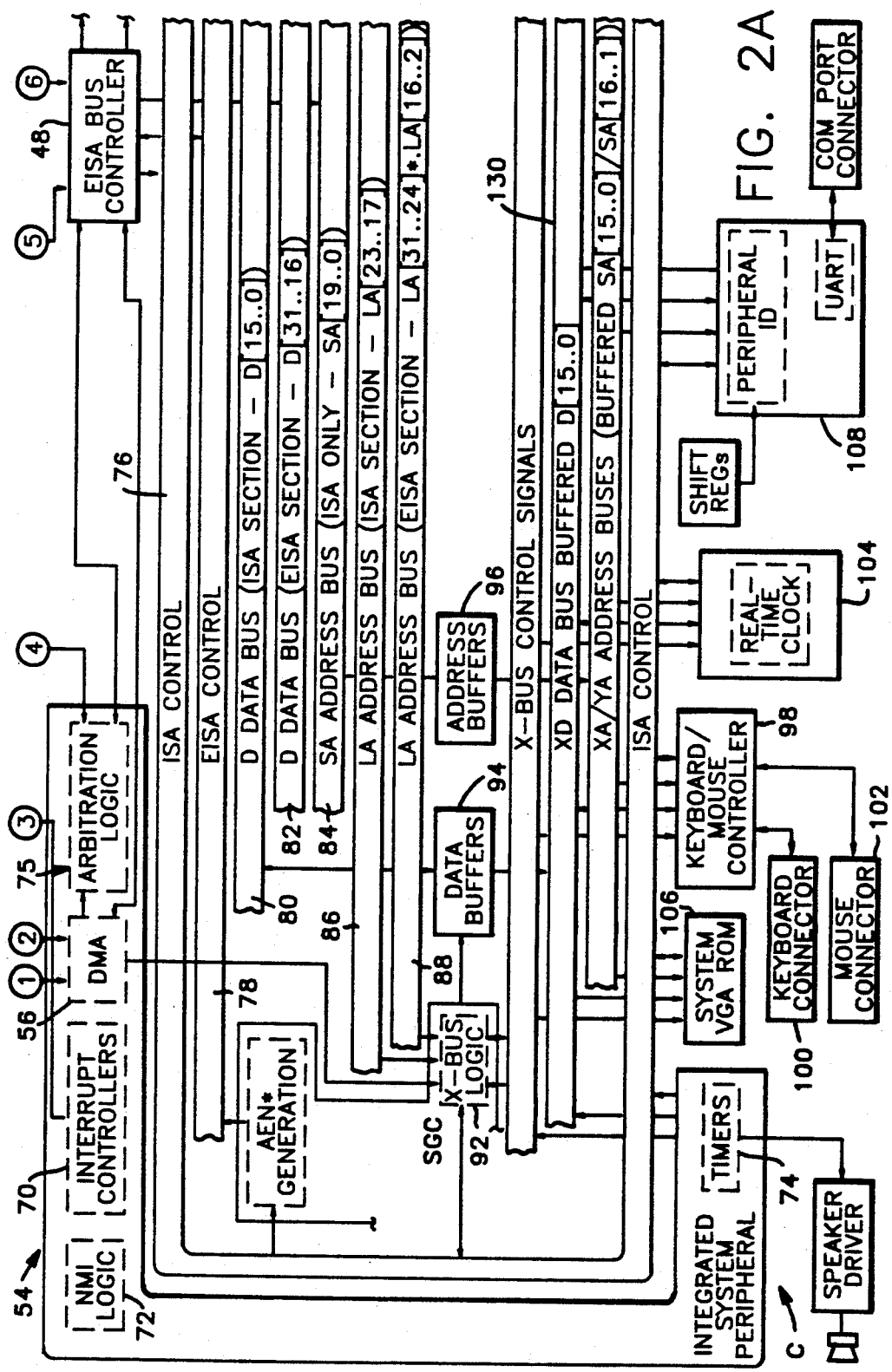

Referring now to FIGS. 1 and 2, the letter C designates generally a computer system upon which the current invention may be practiced. For clarity, system C is shown in two portions, with the interconnections between FIGS. 1 and 2 designated by reference to the circled numbers one to eight. System C is comprised of a number of block elements interconnected via four buses.

In FIG. 1, a computer system C is depicted. A central processing unit (CPU) comprises a processor 20, a numerical coprocessor 22 and a cache memory controller 24 and associated logic circuits connected to a local processor bus 26. Associated with cache controller 24 is high speed cache data random access memory (RAM) 28, noncacheable memory address map programming logic circuitry 30, noncacheable address memory 32, address exchange latch circuitry 34 and data exchange transceiver 36. Associated with the CPU also are local bus ready address enable logic circuit 40 a logic circuit 38, next address enable logic 40 and bus request logic circuit 42.

The processor 20 is preferably an Intel 80386 microprocessor. The processor 20 has its control, address and data lines interfaced to the local processor bus 26. The coprocessor 22 is preferably an Intel 80387 and/or Weitek WTL 3167 numeric coprocessor interfacing with the local processor bus 26 and the processor 20 in the conventional manner. The cache RAM 28 is preferably suitable high-speed static random access memory which interfaces with the address and data elements of bus 96 under control of the cache controller 24 to carry out required cache memory operations. The cache controller 24 is preferably an Intel 82385 cache controller configured to operate in two-way set associative master mode. In FIGS. 1 and 2, the components are the 33 MHZ versions of the respective units. Address latch circuitry 34 and data transceiver 36 interface the cache controller 24 with the processor 20 and provide a local bus interface between the local processor bus 26 and a host bus 44. Circuit 38 is a logic circuit which provides a bus ready signal to control access to the local bus 26 and indicate when the next cycle can begin. The enable circuit 40 is utilized to indicate that the next address of data or code to be utilized by subsystem elements in pipelined address mode can be placed on the local bus 26.

Noncacheable memory address map programmer 30 cooperates with the processor 20 and the noncacheable address memory 34 to map noncacheable memory locations. The noncacheable address memory 32 is utilized to designate areas of system memory that are noncacheable to avoid many types of cache memory incoherency. The bus request logic circuit 42 is utilized by the processor 20 and associated elements to request access to the host bus 44 in situations such as when requested data is not located in the cache memory 28 and access to system memory is required.

In the drawings, system C is configured having the processor bus 26, the host bus 44, an extended industry standard architecture (EISA) bus 46 (FIG. 2) and an X bus 90. The details the portion of the system illustrated in FIG. 2 and not discussed in detail below are not significant to the present invention other than to illustrate an example of a fully configured computer system. The portion of system C illustrated in FIG. 2 is essentially a configured EISA system which includes the necessary EISA bus 46, and EISA bus controller 48, data latches and transceivers 50 and address latches and buffers 52 to interface between the EISA bus 46 and the host bus 44. Also illustrated in FIG. 2 is an integrated system peripheral 54, which incorporates a number of the elements used in an EISA-based computer system.

The integrated system peripheral (ISP) 54 includes a direct memory access controller 56 for controlling access to main memory 58 (FIG. 1) or memory contained in EISA slots and input/output (I/O) locations without the need for access to the processor 20. The main memory array 58 is considered to be local memory and comprises a memory circuit array of size suitable to accommodate the particular requirements of the system. The ISP 54 also includes interrupt controllers 70, nonmaskable interrupt logic 72 and system timers 74 which allow control of interrupt signals and generate necessary timing signals and wait states in a manner according to the EISA specification and conventional practice. In the preferred embodiment, processor generated interrupt requests are controlled via dual interrupt control circuits emulating and extending conventional Intel 8259 interrupt controllers. The ISP 54 also includes bus arbitration logic 75 which, in cooperation with the bus controller 48, controls and arbitrates among the various requests for the EISA bus 46 by the cache controller 24, the DMA controller 56 and bus master devices located on the EISA bus 46.

The main memory array 58 is preferably dynamic random access memory. Memory 58 interfaces with the host bus 44 via a data buffer circuit 60, a memory controller circuit 62 and a memory mapper 68. The buffer 60 performs data transceiving and parity generating and checking functions. The memory controller 62 and memory mapper 68 interface with the memory 53 via address multiplexer and column address strobe buffers 66 and row address enable logic circuit 64.

Figure 2B:
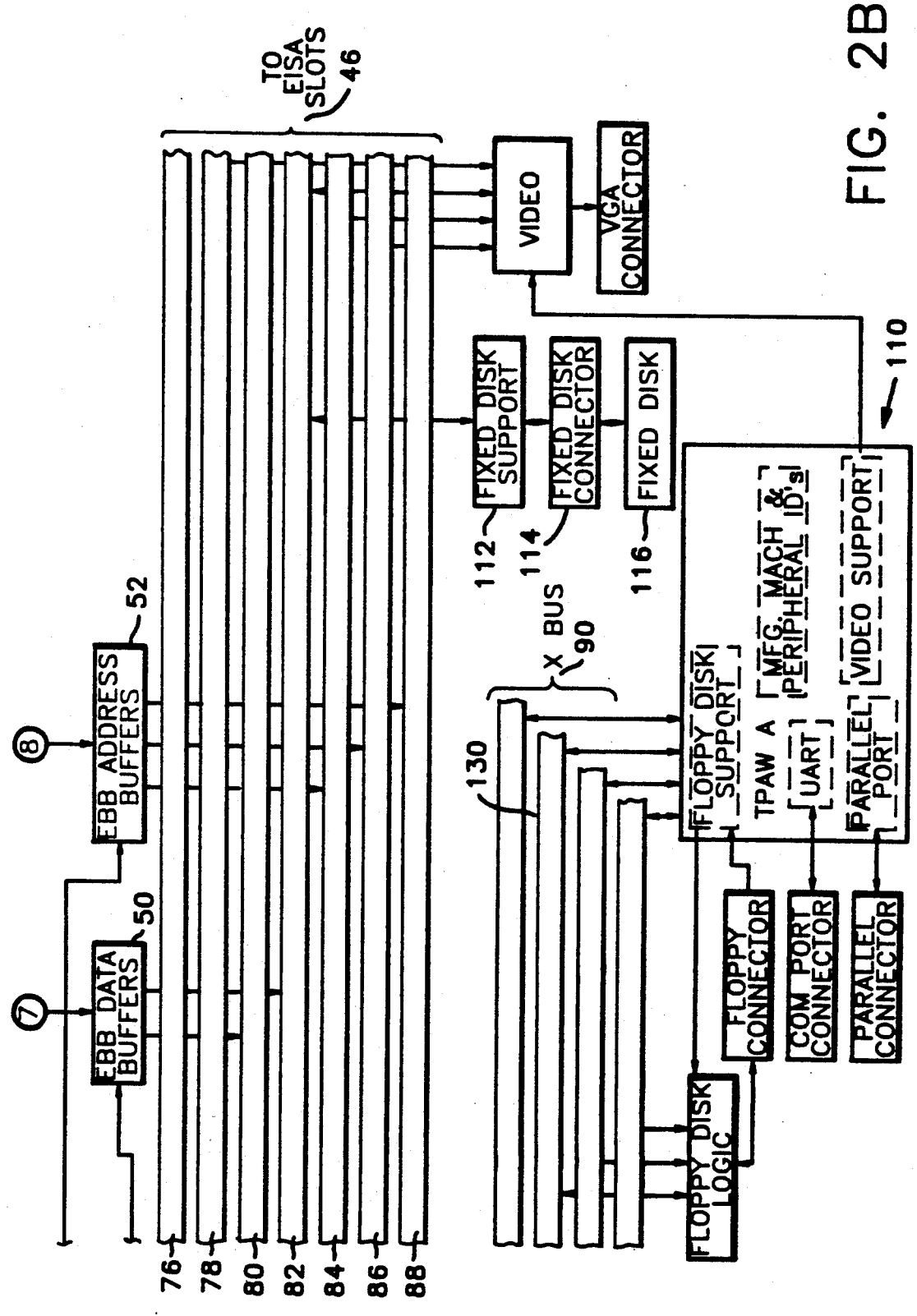

The EISA bus 46 includes ISA and EISA control buses 76 and 78, ISA and EISA control buses 80 and 82, and address buses 84, 86 and 88. Referring to FIG. 2B, system peripherals are interfaced via the X bus 90 in combination with the ISA control bus 76 from the EISA bus 46. Control and data/address transfer for the X bus 90 are facilitated by X bus control logic 92, data transceivers 94 and address latches 96.

Attached to the X bus 90 are various peripheral devices such as keyboard/mouse controller 98 which interfaces the X bus 90 with a suitable keyboard and mouse via connectors 100 and 102, respectively. Also attached to the X bus 90 are read only memory (ROM) circuits 106 which contain basic operations software for the system C and for system video operations. A serial communications port 108 is also connected to the system C via the X bus 90. Floppy and fixed disk support, a parallel port, a second serial port, and video support circuits are provided in block circuit 110 connected to the X bus 90.

II. Disk Controller

Figure 3:
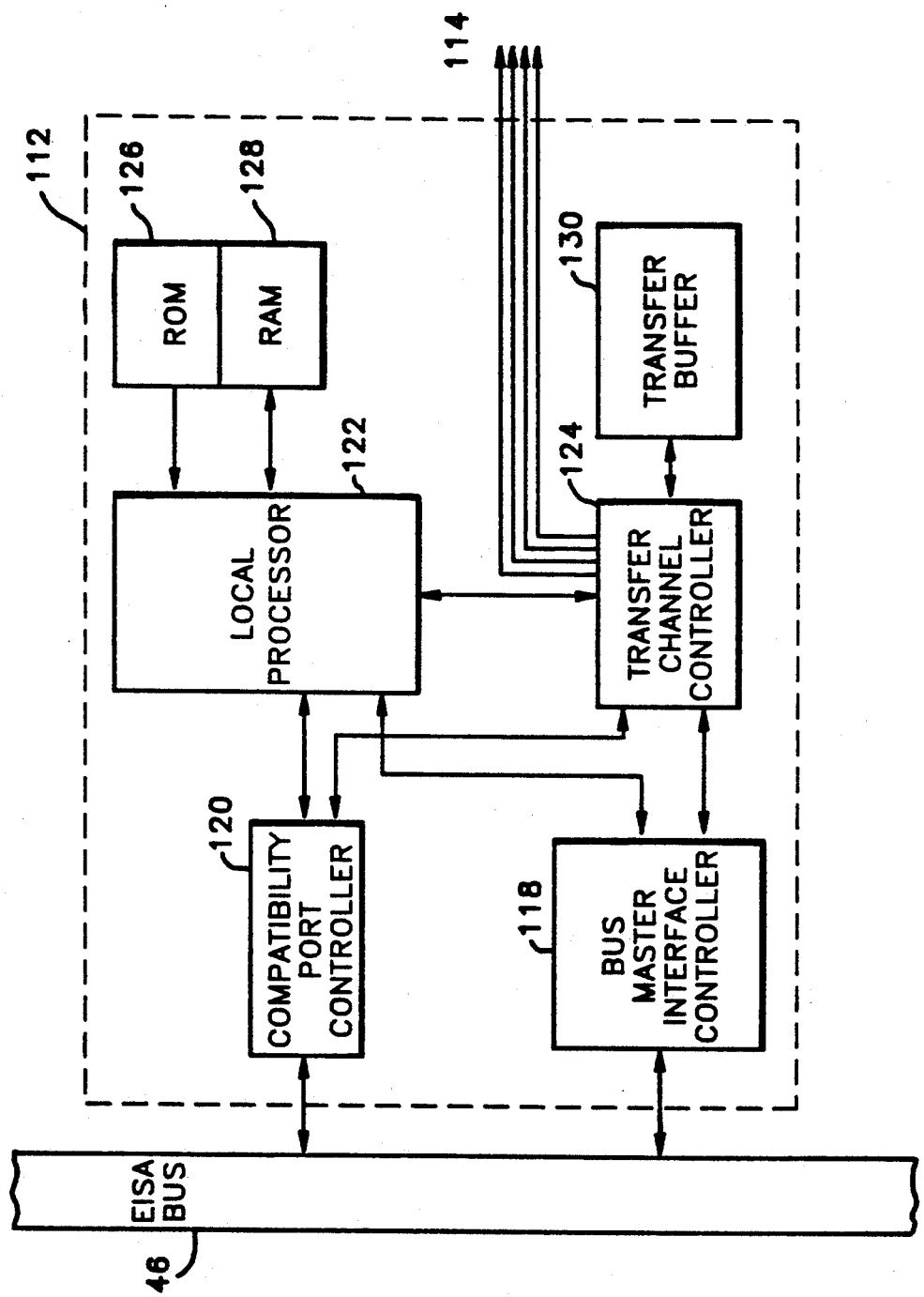
FIG. 3 is a schematic block diagram of an intelligent disk array controller environment in which the present invention may be practiced.

The disk array controller 112 is connected to the EISA bus 46 to provide for the communication of data and address information through the EISA bus. Fixed disk connectors 114 are connected to the fixed disk support system and are in turn connected to a fixed disk array 116. A schematic block diagram of the disk array controller 112 upon which the present invention may be practiced is shown if FIG. 3. It is understood that the disk controller set forth in FIG. 3 is for the purpose of illustrating the environment in which present invention may operate. The method of the present invention may be practiced on any personal computer system disk array having a microprocessor based, intelligent array controller, and indeed can be performed by the system microprocessor in conjunction with more conventional board disk control systems.

The disk array controller 112 includes a bus master interface controller 118 (BMIC), preferably an Intel Corporation 82355, which is designed for use in a 32 bit EISA bus master expansion board and provides all EISA control, address, and data signals necessary for transfers across the EISA bus. The BMIC 118 supports 16 and 32 bit burst transfers between the disk array system and system memory. Additionally, BMIC 118 provides for the transfers of varying data sizes between an expansion board and EISA and ISA devices.

The disk array controller 112 also includes a compatibility port controller (CPC) 120. The CPC 120 is designed as a communication mechanism between the EISA bus 46 and existing host driver software not designed to take advantage of EISA capabilities.

Also included in the disk array controller 112 is a microprocessor 122, preferably an Intel Corporation 80186 microprocessor. The local processor 122 has its control, address and data lines interfaced to the BMIC 118, CPC 120, and a transfer channel controller 124. Further, the local processor 122 is also interfaced to local read only memory (ROM) 126 and dynamic random access memory (RAM) 128 located within the disk array controller 112.

The transfer channel controller (TCC) 124 controls the operation of four major DMA channels that access a static RAM transfer buffer 130 which is used to store data transferred by the disk system. The TCC 124 assigns DMA channels to the BMIC 118, the CPC 120 the local processor 122 and to the disk array DMA channel 114. The TCC 124 receives requests from the four channels and assigns each channel a priority level. The local processor 122 has the highest priority Level. The CPC 120 channel has the second highest priority level. The BMIC 118 channel has the third highest priority level and the disk array DMA channel 114 has the lowest priority level.

The disk array DMA channel 114 is comprised of four disk drive subchannels. The four disk drive subchannels may be assigned to any one of eight different disk drives residing in the disk array. The four drive subchannels have equal priority within the disk array DMA channel. The subchannels are rotated equally to become the source for the disk array DMA channel. One of the subchannels is inserted in rotation only if it has an active DMA request. The remaining three subchannels are always active in the rotation.

In the operation of disk array controller 112, a request is preferably submitted to the disk array controller 112 through the BMIC 118. The local processor 122 on receiving this request through the BMIC 118 builds a data structure in local processor RAM memory 128. This data structure is also known as a command list and may be a simple read or write request directed to the disk array, or it may be a more elaborate request containing multiple read/write or diagnostic and configuration requests. The command list is then submitted to the local processor 122 for processing. The local processor 122 then oversees the execution of the command list, including the transferring of data. Once the execution of the command list is complete, the local processor 122 notifies the operating system device driver. The submission of the command list and the notification of a command list completion are achieved by a protocol which uses the BMIC 118 I/O registers. To allow multiple outstanding requests to the disk array controller 112, these I/O registers are divided into two channels: a command list submit channel and a command list complete channel.

The method of the present invention is implemented as application tasks running on the local processor 122 (FIG. 3). Because of the nature of interactive input/output operations, it is impractical for the present invention to operate as a single batch task on a local processor 122. Accordingly, the local processor 122 utilizes a real time, multitasking operating system which permits multiple tasks to be addressed by the local processor 122, including the present invention. Preferably, the operating system on the local processor 122 is the AMX86 Multitasking Executive by Kadak Products Limited. The AMX86 operating system kernel provides a number of system services in addition to the applications set forth the method of the present invention.

A greater understanding of the manner in which commands are submitted to the disk array controller upon which the present invention may be practiced may be had by reference to currently co-pending U.S. patent application Ser. No. 431,737 to Schmenk et al., entitled BUS MASTER COMMAND PROTOCOL, filed Nov. 3, 1989 and assigned to Compaq Computer Corporation, assignee of the present invention.

III. Background Surface Analysis

The present invention is a method which instructs the local processor 122 to generate a series of read requests during periods of disk inactivity which sequentially read all disk sectors within the disk array, including any disk which is dedicated to fault tolerance techniques such as mirror or parity fault tolerance techniques. The result of the read request is checked by the local processor 122 to determine if the read was successful. If not successful, the present invention notifies the disk controller of the error.

A. Restart

Figure 4:
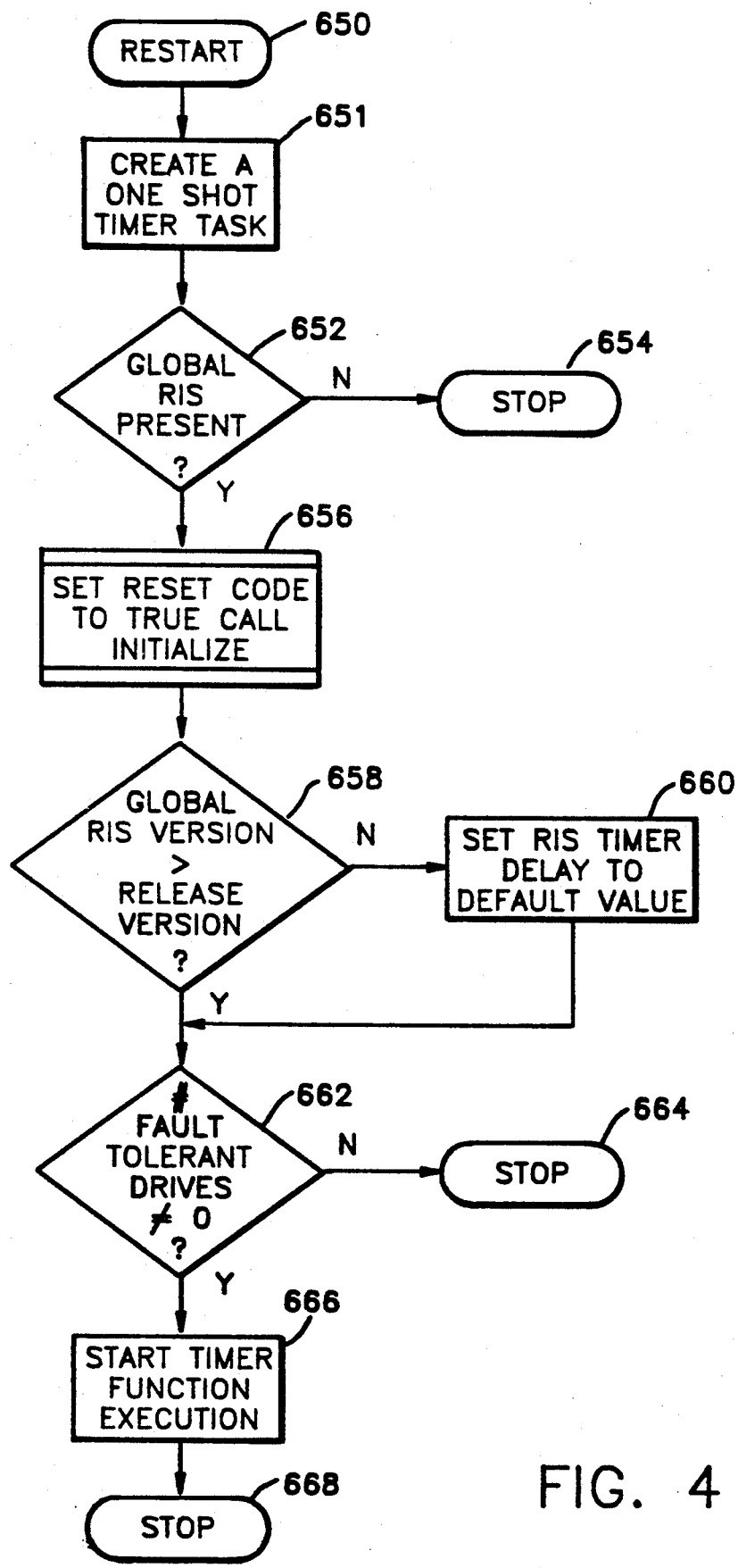
FIG. 4 is a flow diagram of the manner in which the present invention resumes the generation of read requests directed toward the disk array following a reset condition on the computer system upon which the present invention is being practiced.

FIG. 4 is a flow diagram of the RESTART task 650 which is activated after the computer system has been reset such as after a power off condition. Operation of the RESTART task 650 begins at step 651 wherein the local processor 122 creates a one-shot timer task using an AMX system utility. Control transfers to step 652 wherein the local processor 122 determines whether the GLOBAL RIS information is present on the current disk. The GLOBAL RIS information describes the disk array, including, among other parameters, the number of heads, cylinders, sectors, sectors per track and other information, for all disks within the array. This is known as the GLOBAL RIS (reserved information sectors) for the reserved disk sectors on the disk where such information is stored and is initialized upon computer system setup. If not present, control transfers to step 654 and the RESTART task 650 is stopped and background surface analysis is not performed. If the GLOBAL RIS information is present, control of processor 122 transfers to step 656 wherein processor 122 calls the INITIALIZE task 600 (FIG. 6) and sets the RESET code to TRUE. In the INITIALIZE task 600 the processor 122 determines the starting parameters, such as the number of drives to be checked and the individual disk parameters, for example, the number of heads, tracks and cylinders per drive, the number of sectors per track. Upon return from the INITIALIZE task 600, control of processor 122 transfers to step 658 where the processor 122 checks to determine if the current version of the GLOBAL RIS is greater than the initial release version. This is done to determine if the disk array controller has been configured to include the present invention. If the RIS version is less than the initial release version which incorporates the present invention, a default delay parameter to be used with the TIMER task 680 (FIG. 8) is added to the GLOBAL RIS and the version information is updated to at least the initial release version. The TIMER delay may be selectively set by the user by causing the host processor 20 to issue a command which updates the GLOBAL RIS with the new TIMER delay period. This is performed by means of a utility program not described in this specification. In the preferred embodiment, the TIMER delay is fifteen (15) seconds. If it is determined in step 658 that the current RIS version is less than the initial release version, control transfers to step 660 where the GLOBAL RIS is updated and the TIMER delay value is set to the default value. Control is then transferred to step 662. If it is determined in step 658 that the current RIS version is not less than the initial release version, control transfers to step 662 wherein processor 122 determines if the number of fault tolerant drives within the array, as determined by the INITIALIZE task 600, is greater than zero. If not greater than zero, control of processor 122 transfers to step 664 where the task is stopped. If greater than zero, control transfers to step 666 which initiates the one-shot timer which is utilized in the present invention for delay purposes prior to starting or restarting the actual surface analysis. Control then transfers to step 668 which ends execution of the task.

B. Surface Analysis

FIGS. 5A-5D are flow diagrams of the SURFACE_ANALYSIS task 500 within the present invention running on the local processor 122 which generates sequential read requests for all disk sectors within the disk array. Operation begins at step 502, wherein processor 122 determines whether the variable NEXT_ACTION to be carried out is the issue of a background read request. NEXT_ACTION is initialized to issue a read request. If the NEXT_ACTION value is the issue of a read request, control transfers to step 504 where the number of pending logical read or write requests is stored to a local variable within the controller memory 128. Control then transfers to step 506. If in step 502 it is determined that the next action to be carried out by the current task is not an issue read request, control transfers to step 506. In step 506 the processor 122 calls the INITIALIZE task 600. When the INITIALIZE task 600 is called in step 506, a code indicating a NON-RESET condition is sent to the task 600. Upon return from the INITIALIZE task 600, control transfers to step 508 wherein processor 122 checks for the number of fault tolerant drives within the array, which is determined by the INITIALIZE task 600 called in step 506. If the number of drives is equal to zero, control transfers to step 510 wherein the processor 122 halts operation of the current task. If the number of fault tolerant drives within the array is non-zero, control transfers to step 512 which is a switch based upon the next action to be taken.

Figure 5A:
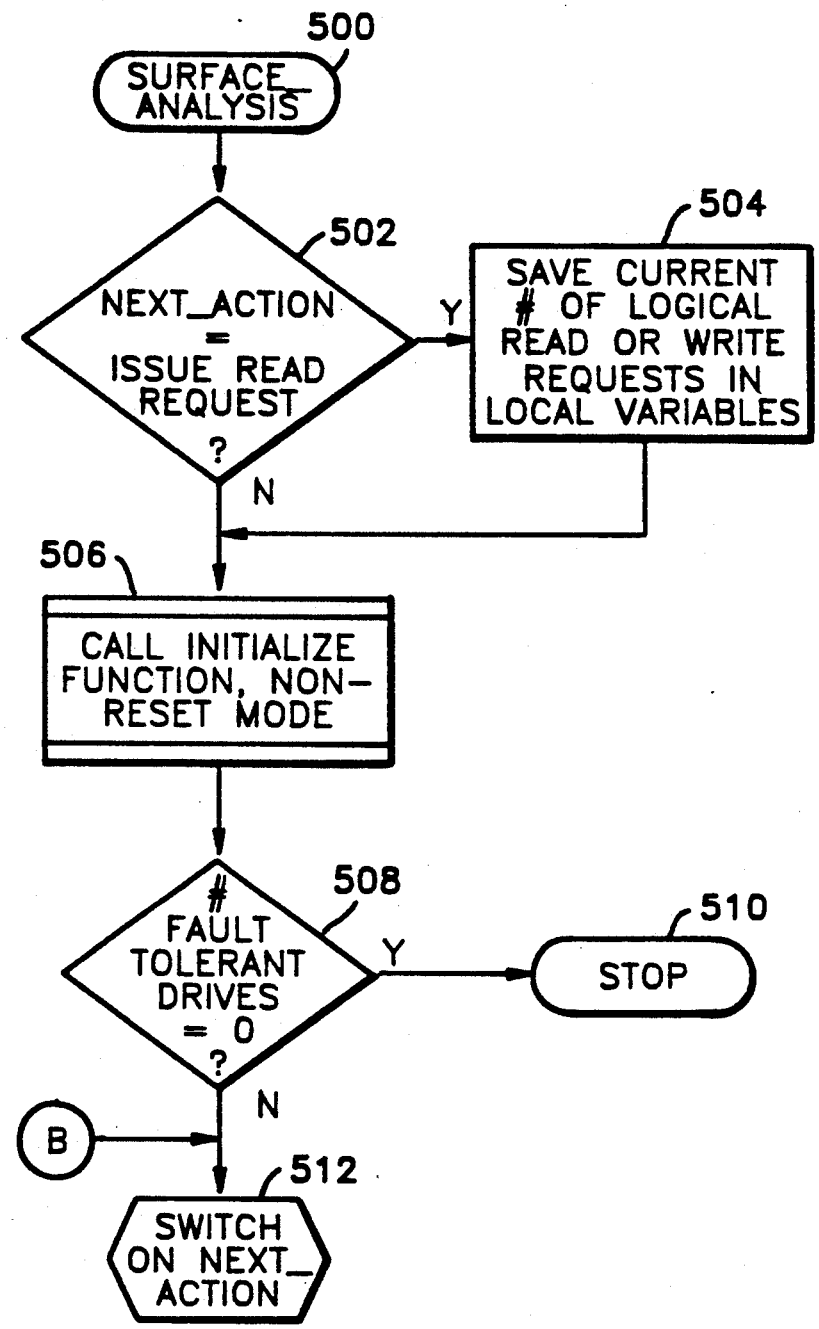
FIGS. 5A-5D are flow diagrams of the manner in which the present invention generates read requests for all sectors within a disk array.
Figure 5B:
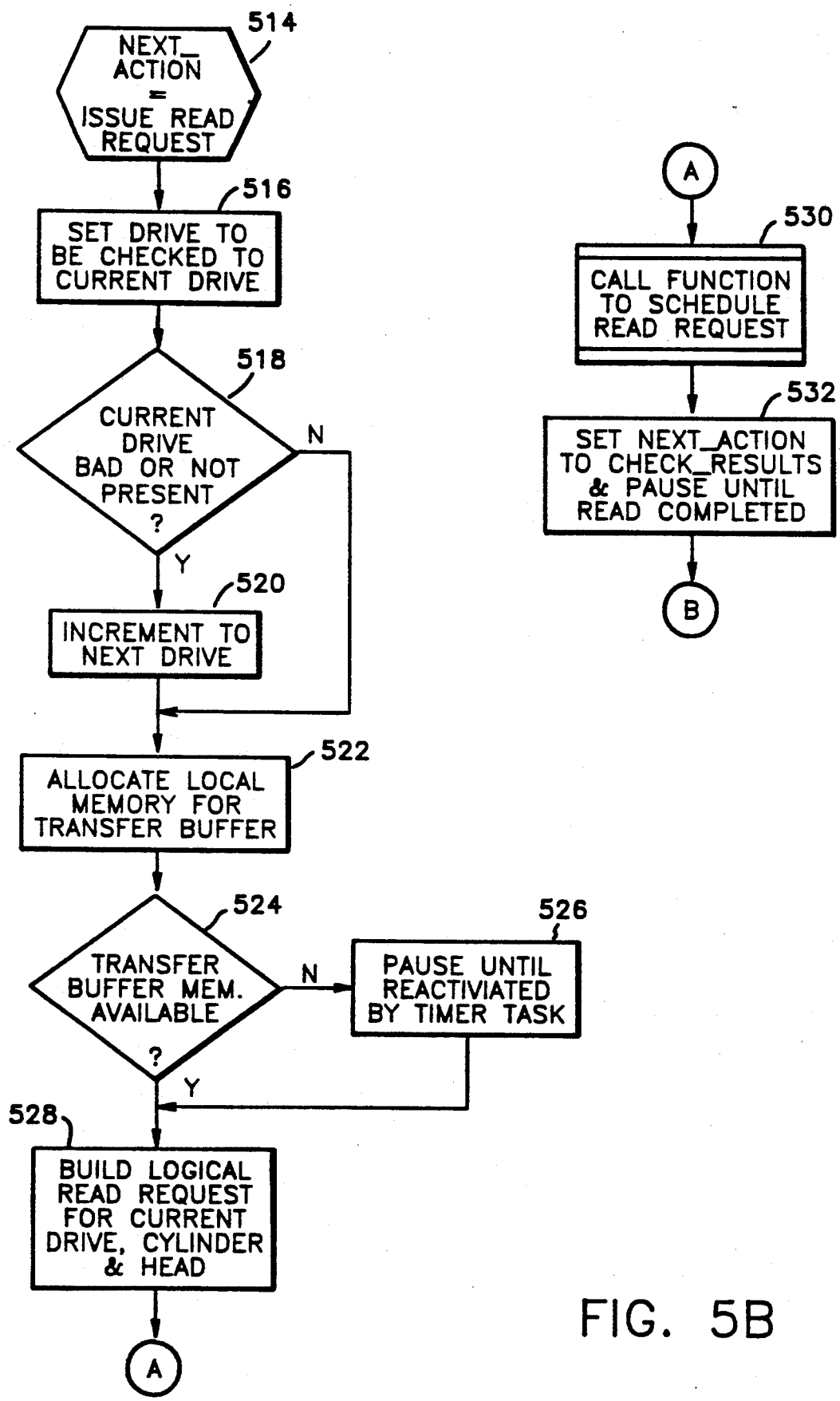

If the NEXT_ACTION variable is set to issue a read request, control transfers to step 514 (FIG. 5B). Control then transfers to step 516 wherein the processor 122 sets the drive to be checked to the current drive being addressed by the task 500. Control transfers to step 518 which determines whether the current drive is a bad drive within the array, based upon parameters returned from the INITIALIZE task 600 called in step 506. If the current drive is a bad drive, control transfers to step 520 wherein the processor 122 increments the current drive pointer to the next drive in the array. Control then transfers to step 522. If it is determined in step 518 that the current drive is not faulty or bad, control transfers to step 522. In step 522, the local processor 122 allocates RAM memory 128 for a transfer buffer to return the data and condition codes resulting from the read request. Control transfers to step 524 wherein the processor 122 tests whether there exists sufficient RAM memory 128 to allocate for the read request transfer buffer. If there is not sufficient memory 128, control transfers to step 526 where execution pauses until the TIMER task 680 reactivates or wakes up the SURFACE_ANALYSIS task 500. After the TIMER task 680 restarts the SURFACE_ANALYSIS task 500, control transfers to step 528. The lack of sufficient memory 128 will generally occur when the disk controller 112 is attempting to perform a number of I/O transfers. Thus, the lack of memory 128 will occur when the array controller 112 is busy. If it is determined in step 524 that there is sufficient memory 128 for the transfer buffer associated with the read request, control transfers to step 528 wherein the processor 122 generates a logical read request for the current drive, head and cylinder. In a hard disk, a track references a radial position on a single rotating disk media. The track itself is composed of multiple disk sectors which describe a radial portion of the track. The sectors per track information is stored within the GLOBAL RIS information on each disk within the disk array. Most hard disk media are composed of multiple coaxial disks. Thus, the same track position on each of the disks is referenced as a cylinder. When a drive request is issued for a specific head, cylinder and disk, the disk and cylinder information are explicitly specified and the track information is specified by the head associated with the particular disk. In the present invention, a read request is intended to read all sectors on a particular track.

Control transfers to step 530 in which the SURFACE_ANALYSIS task 500 queues the current read request to be acted upon by the controller 112. In the preferred embodiment, a better understanding of the method of generation of the read request and the scheduling of the request may be had with reference to previously referenced application Ser. No. 431,737. Control of the processor 122 is transferred to step 532 wherein the NEXT_ACTION variable is set to check the results of the read request and execution is paused until the read request is completed. After the read request is completed execution recommences and control then transfers to step 512.

Figure 5C:
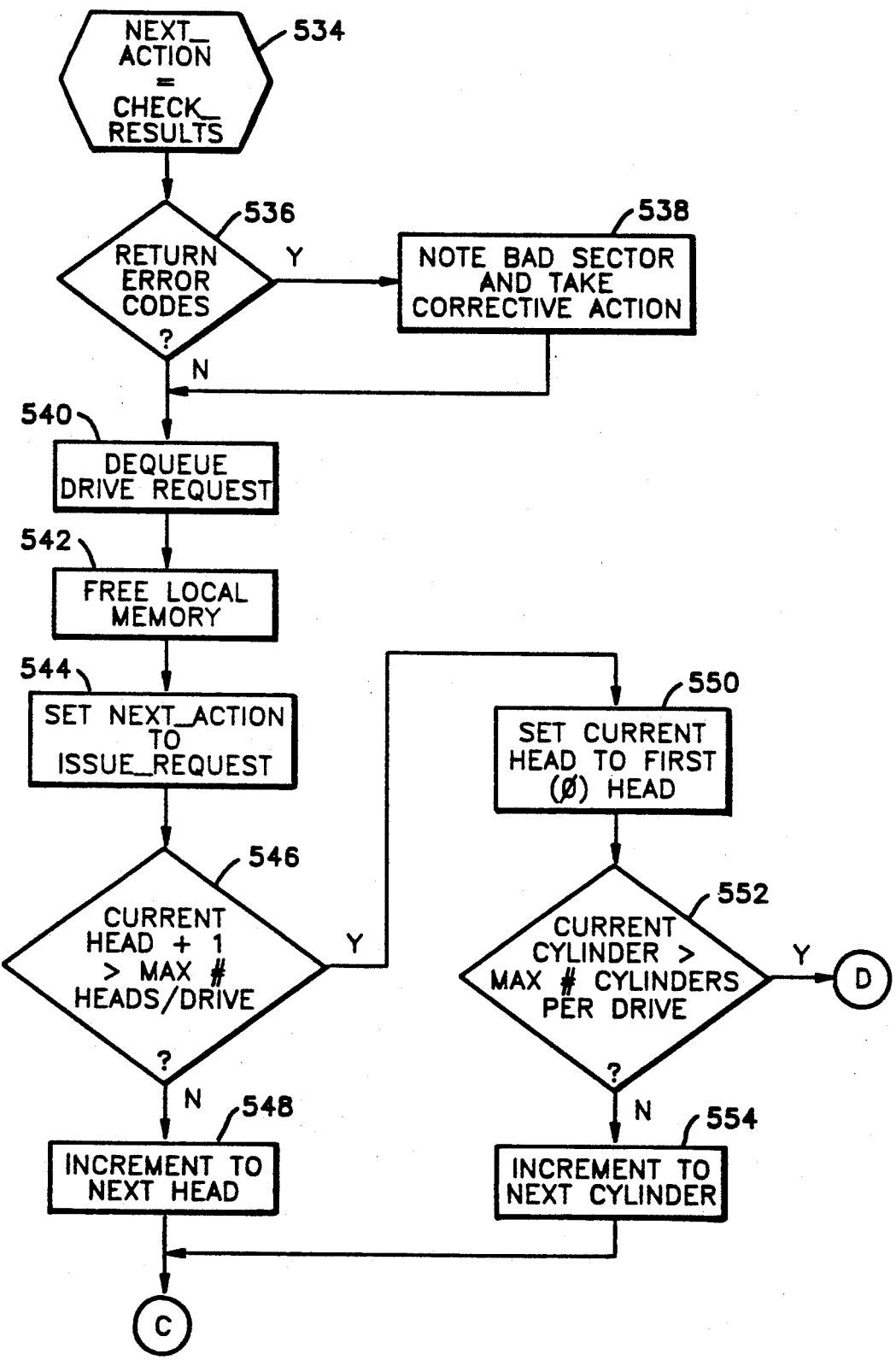

If in step 512, it is determined that the next action to be taken by the task 500 is to check the results of the read request, control transfers to step 534 (FIG. 5C). Control transfer to step 536, wherein the processor 122 reads the transfer buffer to determine if an error code indicating disk sector failure has been returned by the read request. If a read request has an error code returned, control transfers to step 538. An error code will be returned if any one of the sectors within the track specified in the read request is faulty. In step 538 the task 500 notifies the controller of the disk failure. The failure notification may be acted upon locally by the disk controller 112 or may be passed on to the host system via BMIC 118 to permit the operator or operating system to take any corrective action necessary. One means of corrective action which may be taken locally is the automatic remapping of a faulty sector to a new sector on the same disk. This method of automatically remapping a faulty disk sector is described in co-pending U.S. application Ser. No. 556,646 to Ewert et al., for AUTOMATIC HARD DISK BAD SECTOR REMAPPING, filed Jul. 20, 1990 and assigned to Compaq Computer Corporation. However, it is understood that other methods of corrective action, such as manual intervention and regeneration of the data contained within the faulty disk sector may be taken. Control of the processor 122 transfers to step 540. If its is determined in step 536 that the completed read request did not return an error code, control transfers to step 540 in which the processor 122 removes this current read request from the disk controller 112 queue. This is necessary to permit the memory 128 which has been allocated to the read request to be deallocated. If the read request is not dequeued, the local memory 128 could not be deallocated and would rapidly be filled with completed read requests, as well a new requests and data to be transferred. Control transfers to step 542 wherein the processor 122 deallocates the memory 128 which was allocated for return information from the drive request. Control transfers to step 544 wherein processor 122 sets the NEXT_ACTION variable to issue a new read request.

Figure 5D:
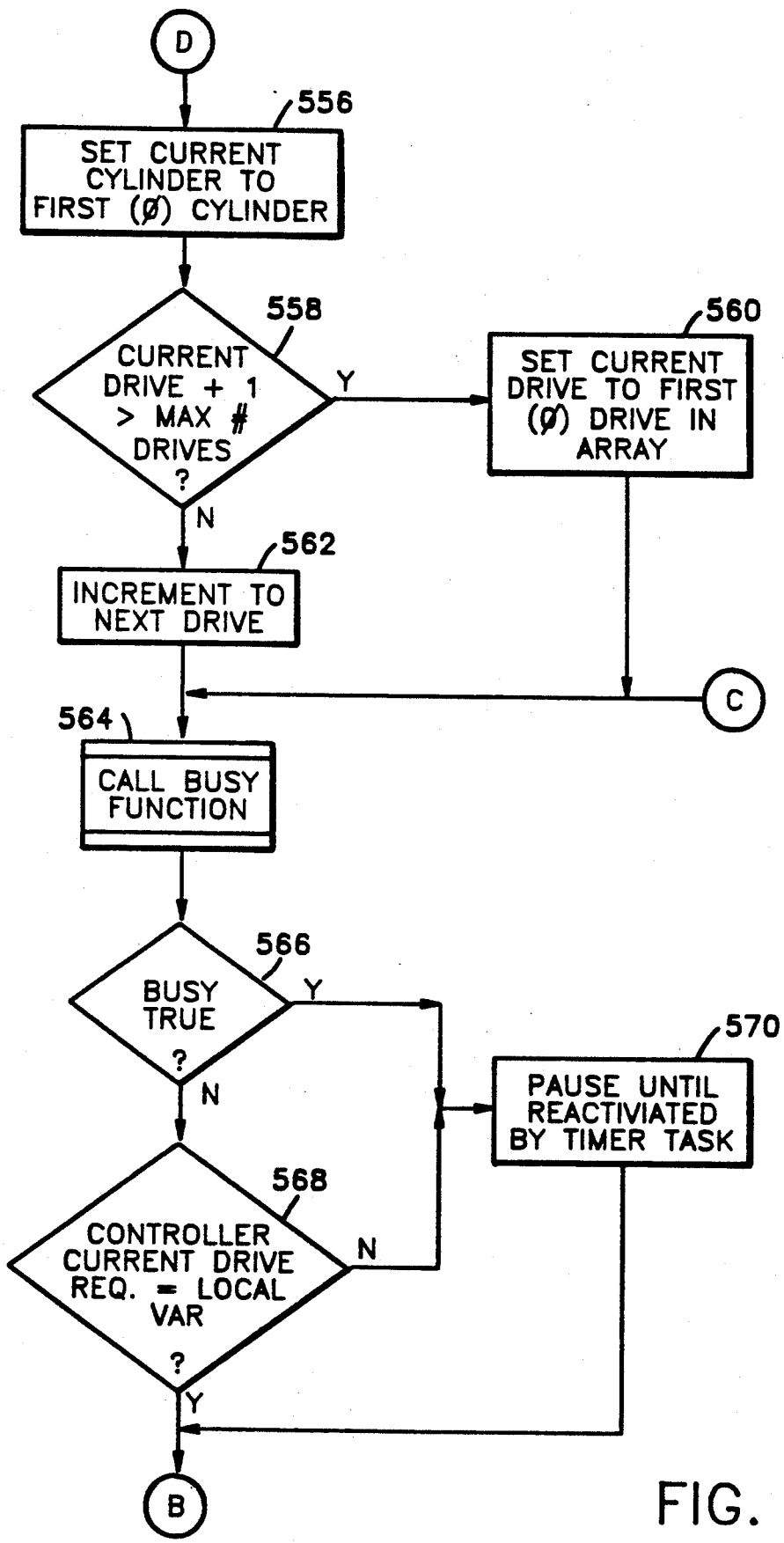

In order to read all disk memory locations, it is necessary that the present invention increment to the next applicable head, cylinder and drive as required to sequentially read all disk sectors. Control transfers to step 546 wherein processor 122 determines whether incrementing to the next head will exceed the maximum number of heads for the drive currently being checked. If it is determined that the maximum number of heads for the present drive will not be exceeded, control transfers to step 548, which increments to the next head for the current drive. Control then transfers to step 564 (FIG. 5D).

If it is determined in step 546 that the current head is the last valid head designated for the present drive, control transfers to step 550, which sets the current head pointer to the first head for a drive. Control transfers to step 552 wherein the processor 122 determines if the current cylinder is at the last cylinder for the drive. If not on the last cylinder, control transfers to step 554 which increments the current cylinder to the next cylinder on the current drive. Control then transfers to step 564 (FIG. 5D). If it is determined in step 552 that the current cylinder is the last valid cylinder for the current drive, control transfers to step 556 which sets the current cylinder equal to the first cylinder for a drive. Control then transfers to step 558 which determines whether the current drive is the last valid drive in the array. If the last valid drive in the array, control transfers to step 560 which sets the current drive equal to the first drive in the array. If it is determined in step 558 that the current drive is not the last drive in the array, control transfers to step 562 which increments to the next drive in the array.

Thus, the SURFACE_ANALYSIS task 500 will progressively issue read requests for all heads for a cylinder for a drive, all cylinders for a drive and then for all drives in an array. Control transfers to step 564 which calls the BUSY task 700 (FIG. 9) to determine if there are pending disk I/O tasks. Control transfers to step 566 which determines whether the BUSY task 700 returns a TRUE code. If a TRUE code is returned, control transfers to step 570 where execution pauses until reactivated by the TIMER task 680, which waits a predetermined time after all drive requests are completed before reactivating the SURFACE_ANALYSIS task 500. After reactivation control returns to step 512. If it is determined in step 566 that the BUSY code is FALSE, control transfers to step 568 wherein the processor determines whether the local variable in which the number of pending I/O requests is equal to the number of currently pending I/O requests. If equal, no new pending I/O tasks have been received and control transfers to step 512. If not equal, the SURFACE_ANALYSIS task 500 will conclude that at least one new task has been received by the disk array controller 112 which has not been acted upon and control transfers to step 570 wherein the SURFACE_ANALYSIS task 500 goes inactive until reactivated by the TIMER task 680.

Thus, the SURFACE_ANALYSIS task 500 will continue to loop and sequentially check all sectors within the disk array in a background mode. If the disk array is actively processing I/O requests, the SURFACE_ANALYSIS task 500 will go into an inactive state for a predetermined period of time.

C. Initialize

Figure 6A:
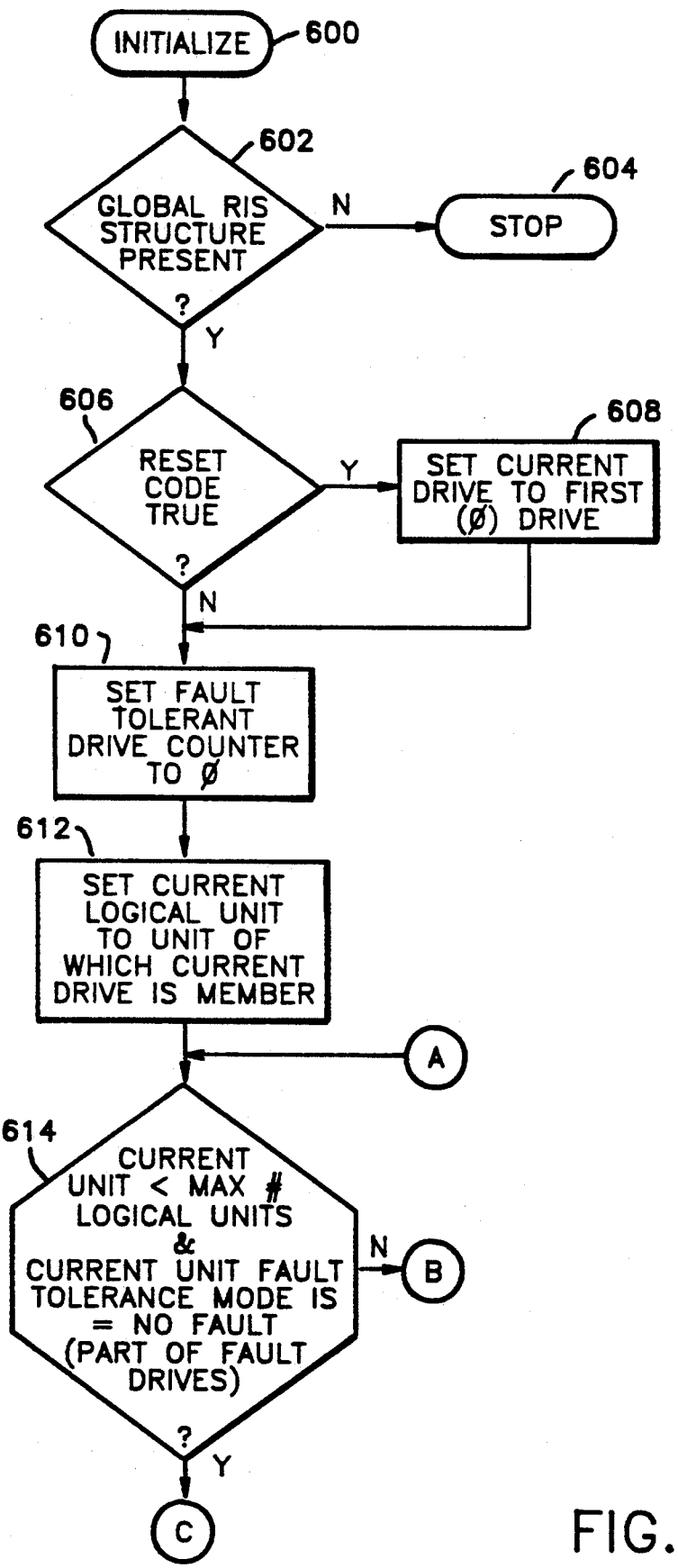
FIGS. 6A and 6B are flow diagrams of the manner in which the present invention initialize disk array parameters prior to generating read requests directed to the disk array.
Figure 6B:
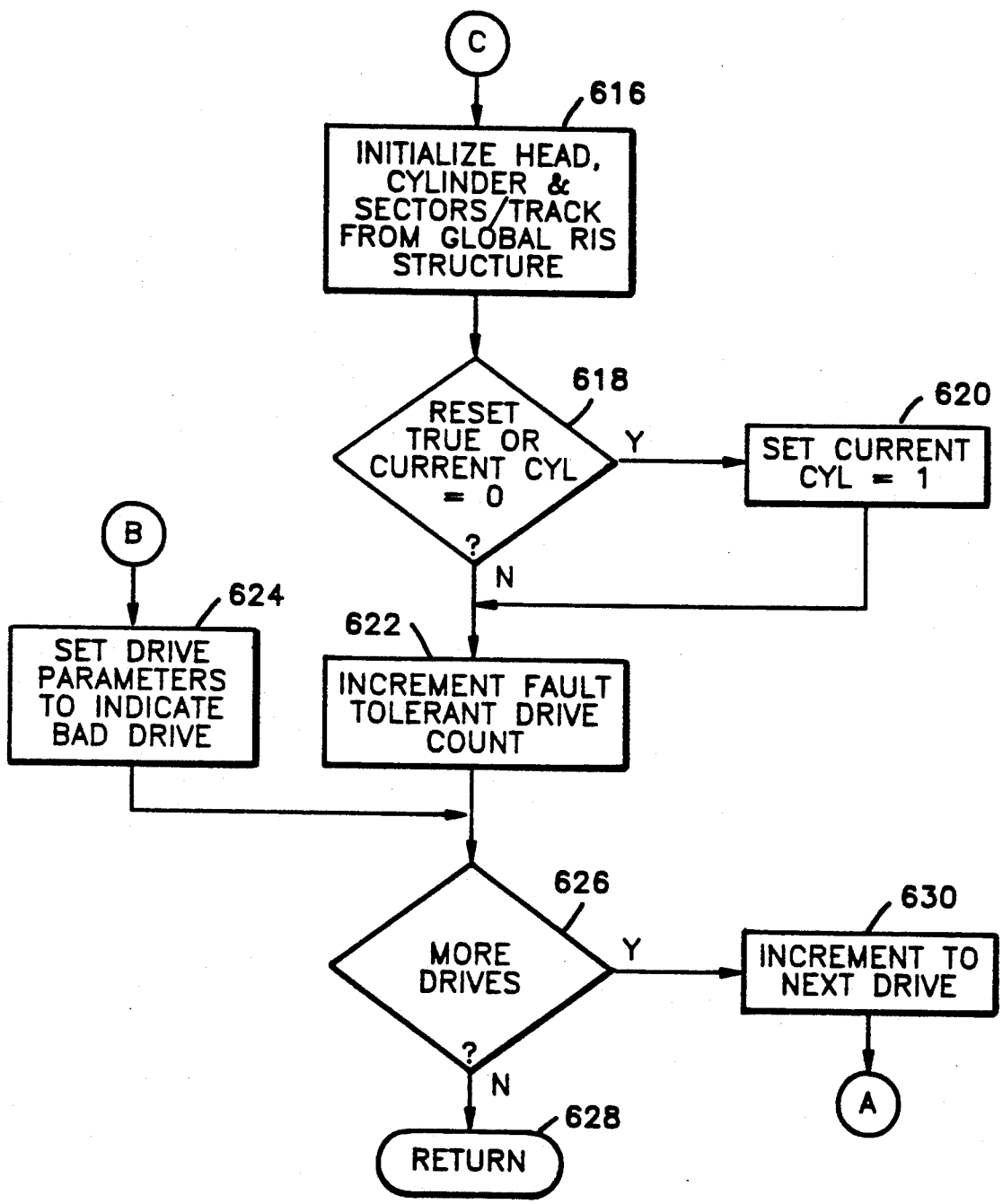

FIGS. 6A and 6B are flow diagrams of the INITIALIZE task 600 which is used to set the initial parameters for the generation of the read requests by the SURFACE_ANALYSIS task 500. Operation of the INITIALIZE task 600 begins at step 602 wherein the processor 122 determines whether information which describes the disk array, including parameters such as heads, cylinders, sectors, sectors per track and other information, for all disks within the array is present. This is known as the GLOBAL RIS (reserved information sectors) for the reserved disk sectors on the disk where such information is stored and is initialized upon computer system setup. If not present, control transfers to step 604 and operation of the task ceases. If the GLOBAL RIS is present, control transfers to step 606 where the processor 122 determines whether a RESET code, which is set by RESTART task 650, is present. If the RESET code is present, control transfers to step 608, which sets all parameters to the first head, first cylinder and first disk within the array. Control then transfers to step 610. If it is determined in step 606 that no RESET code is set, such as when the INITIALIZE task 600 is called by SURFACE_ANALYSIS task 500, control transfers to step 610 where the processor 122 initializes a disk counter. Control transfers to step 612 which sets the current logical volume to the volume of which the current disk is a member. Control transfers to step 614.

In step 614, the local processor 122 determines whether the current unit is a valid logical unit for the array and whether the current unit is part of a logical unit which includes a fault tolerance technique. It should be noted that a logical unit identifies no only the fault tolerant disk associated with the unit, but the data disks as well. If true, control transfers to step 616 (FIG. 6B) wherein processor 122 initializes all variables associated with a disk request, such as number of reads, cylinders, disks, etc. to the disk parameters stored within the GLOBAL RIS. Control transfers to step 618 wherein the processor 122 tests whether the current cylinder is set to cylinder zero, which would indicate a drive which has never been used, or whether the RESET code is TRUE. If either condition is true, control transfers to step 620 which sets the current cylinder equal to cylinder 1. Control thereafter transfers to step 622. If both conditions are false in step 618, control of processor 122 transfers to step 622 wherein the valid fault tolerant drive count is incremented. Control then transfers to step 626. If in step 614, it is determined that the current unit is not a valid logical unit or that the current unit is not set for fault tolerant operation, control transfers to step 624 (FIG. 6B), in which the drive parameters are set to indicate that the current drive is also faulty as a result of the current logical unit being faulty. Control transfers to step 626. In step 626, the local processor 122 determines whether there are additional drives within the array. If there are additional drives, control of the processor 122 transfers to step 630 which increments to the next drive and control then is transferred to step 614. If there are no further drives in the array, control transfers to step 628 which returns to the calling task.

D. Schedule Operations

Figure 7A:
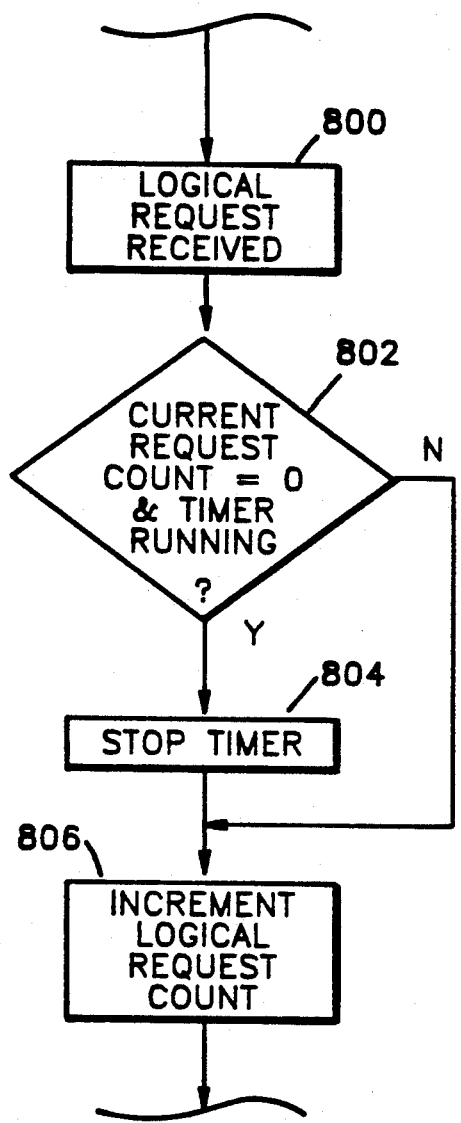
FIGS. 7A and 7B are portions of a task for scheduling logical read and write requests pertinent to the present invention.
Figure 7B:
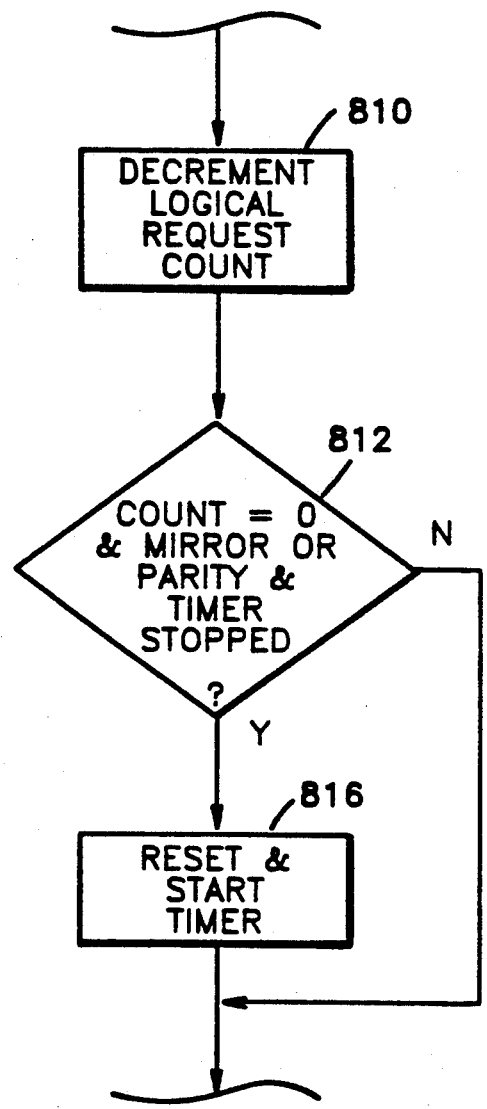

FIGS. 7A and 7B are portions of a procedure used to process logical requests sent to the disk array. These portions are used to manage the operation of the TIMER task 680 in the present invention. In the preferred embodiment, these procedures are an integral part of the scheduling task for the disk array running on local processor 122. However, it is understood that these tasks could be implemented as independent functions for the management of timing events in the present invention.

In FIG. 7A, at step 800 the local processor 122 receives a logical request. Control transfers to step 802 wherein the local processor 122 determines whether the current logical request count is equal to zero and whether the TIMER as initialized in the RESTART task 650 or elsewhere is running. If both conditions are true, control transfers to step 802, wherein the local processor 122 stops and clears the one-shot timer task operating under the control of the AMX operating system. Control is then transferred to step 806 which increments the logical request count. Thus, when the local processor 122 receives a logical request, the one-shot timer task is halted and the present invention goes inactive. Control then proceeds to other processing steps necessary when a request has been received.

In FIG. 7B, the section of code represents the completion of a logical request. In step 810, the local processor 122 decrements the logical request count upon completion of the logical request. Control transfers to step 812 wherein the local processor 122 determines whether the logical request count is equal to zero and the current logical unit is set for either mirror or parity fault tolerance mode and whether the one-shot timer task has been stopped. If all of the above conditions are true, control transfers to step 814 wherein the local processor 122 resets the one-shot timer task to the time indicated in the GLOBAL RIS and starts the timer running. When the one-shot task completes, the TIMER task 680 is called. If another request is received prior to the one-shot task completing, the local processor 122 will enter a task path which will result in it halting and clearing the one-shot timer as set forth in FIG. 7A. Thus, the present invention will reset and start the one-shot timer upon completion of all pending operations. When the one-shot timer task completes, the TIMER task 680 itself is called.

E. Timer

Figure 8:
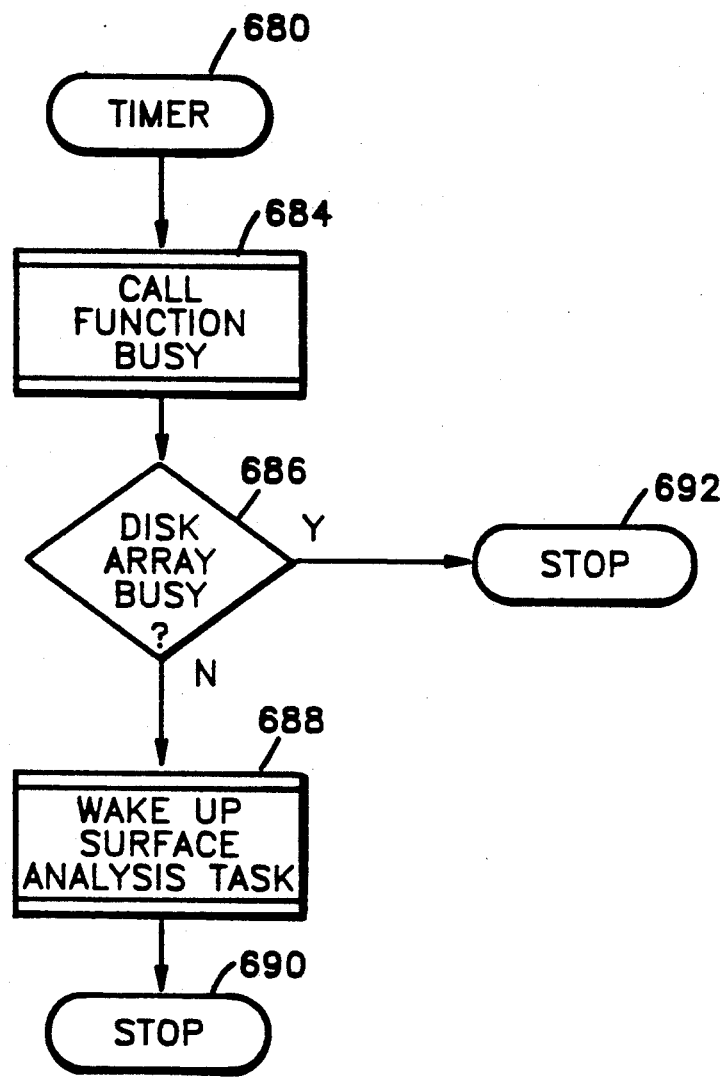
FIG. 8 is a flow diagram of the manner in which the present invention activates the generation of read requests after a specified time of disk array inactivity.

FIG. 8 is a flow diagram of the TIMER task 680. Operation begins at step 684 following the completion of the one-shot timer task wherein the local processor 122 calls the BUSY task 700 to determine if the disk controller 112 is performing I/O operations. Upon return from the BUSY task 700, control transfers to step 686 wherein processor 122 determines whether the disk controller 112 is, in fact, busy. If the BUSY code is TRUE, control transfers to step 692, where the TIMER task 680 is halted. If the BUSY code is set to FALSE, control transfers to step 688 wherein processor 122 reactivates operation of the SURFACE_ANALYSIS task 500. Control transfers to step 690 where the TIMER task 680 is halted.

F. Busy

Figure 9:
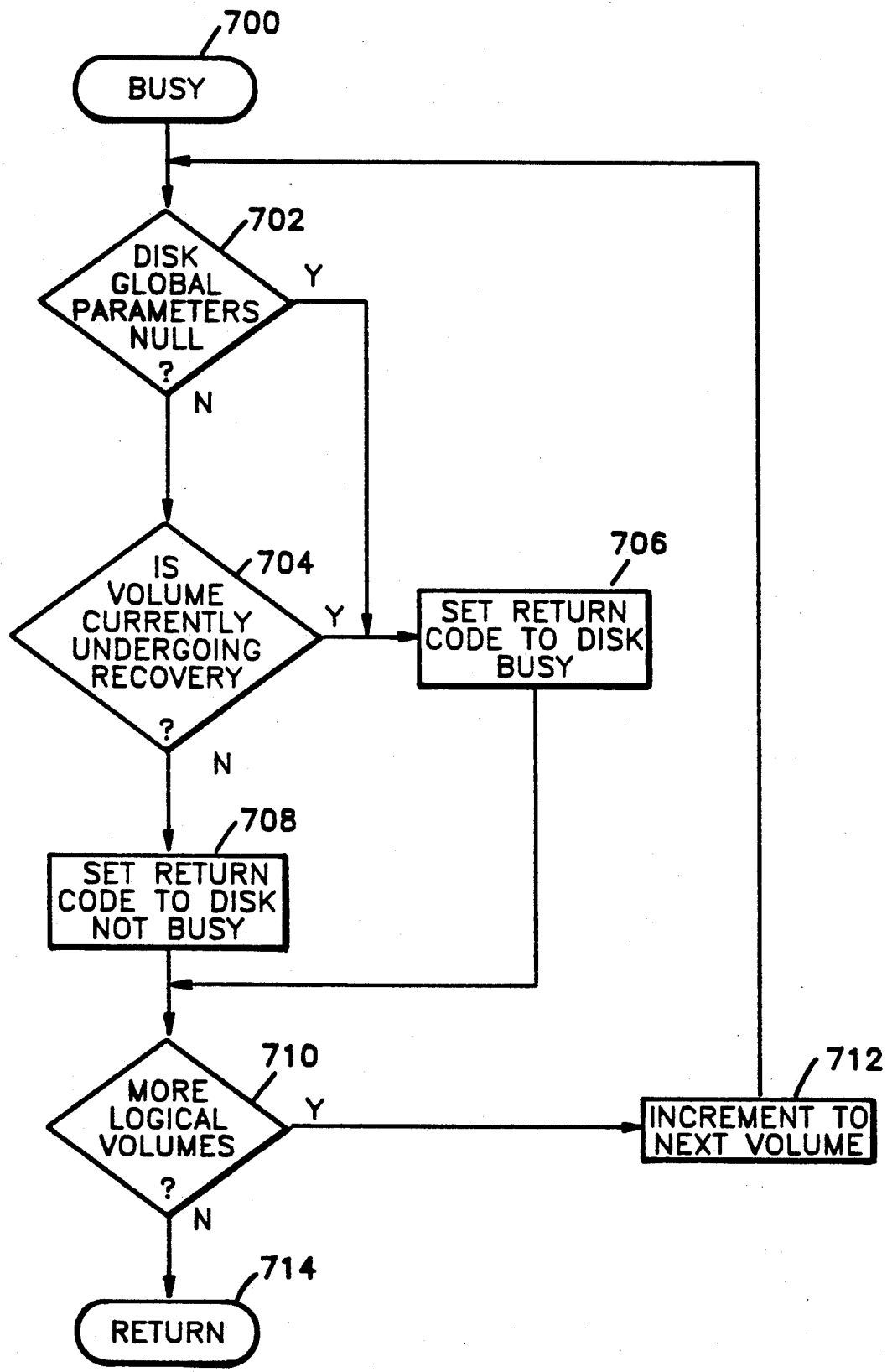
FIG. 9 is a flow diagram of the manner in which the present invention determines if the disk array system is currently performing read or write operations or is otherwise busy.

FIG. 9 is a flow diagram of the BUSY task 700, which is used by the present invention to determine if the disk array is carrying out a particular type of I/O operations referred to as regeneration. Operation begins at step 702 wherein the local processor 122 determines if the GLOBAL RIS parameters are set to null which would indicate a bad or missing disk. If yes, control transfers to step 706. If it is determined in step 702 that the GLOBAL RIS parameters are present, control transfers to step 704 where the local processor 122 tests to determine if the current volume is currently undergoing data regeneration. The preferred embodiment will indicate in the GLOBAL RIS structure when a drive has been replaced and/or data for a drive is being regenerated. In such instance, it is inadvisable to direct a read request to a drive that is being regenerated. If the drive is being regenerated, control transfers to step 706. In step 706, the BUSY code is set to TRUE and control transfers to step 710. If it is determined in step 704 that the current volume is not being regenerated, control transfers to step 708 which sets the BUSY code to FALSE. Control then transfers to step 710 wherein the processor 122 determines whether there are additional logical volumes within the disk array. If there are additional volumes within the disk array, control transfers to step 712 which increments to the next logical volume. Control is then transferred back to step 702 which will cause the BUSY task 700 to loop until all logical volumes have been checked. If there are no additional logical volumes within the array, control transfers to step 714 which returns control of the local processor 122 to the calling task.

IV. Conclusion

It will be appreciated that the method of issuing and performing background read requests directed to all drives within a disk drive array, including drives dedicated to parity and mirror fault tolerant techniques will increase the reliability of the disk array. Failures on a mirror or parity disk will be routinely detected prior to their actually being required for regeneration of data. Thus, the disk may be replaced or faulty sectors remapped to valid sectors on the disk.

The foregoing disclosure and description of the invention are illustrative and explanatory thereof, and various changes in the size, shape, materials, components, circuitry, wiring connections and contacts, as well as in the details of the illustrated circuitry, construction and method of operation may be made without departing from the spirit of the invention.

What is claimed is:

1. For use with a computer system having a fault tolerant, intelligent mass storage disk array subsystem having individual disk and disk array parameters and associated status information for the disk and disk array, a method for performing disk sector analysis for all drives within the disk array, the steps comprising:
   (a) initializing a current disk memory location based upon the disk array and disk drive status information and current disk parameters;
   (b) determining whether the disk array is in the process of carrying out disk operations, and if carrying out such operations, suspending operation of the method of the present invention for a predetermined period of time and repeating this step (b) until disk operations are not being carried out;
   (c) performing a read operation on the current disk memory location;
   (d) checking the results of the read operation to determine if the read operation has failed and upon detection of a failure, indicating the disk media failure for the current disk memory location;
   (e) incrementing to a successive disk memory location; and
   (f) continuously performing steps (b) through (e) for all disk memory locations for all disks located within the disk array.

2. The method of claim 1, wherein the step of initializing disk memory location further includes determining if the computer system has been reset and if having been reset, initializing the current disk memory location to a predetermined disk memory location within the disk array.

3. The method of claim 1 wherein the step of determining if the disk array is active further includes determining if the disk array controller has received but not acted upon a input or output operation request.

4. The method of claim 3, wherein the step of determining whether the disk array is active further includes determining whether the disk on which the current disk memory location is located is currently being regenerated.

5. For use with a computer system having a fault tolerant, intelligent mass storage disk array subsystem, a method for performing disk sector analysis for all drives within the disk array, the steps comprising:
   (a) determining disk and disk array parameters and current status information;
   (b) initializing a current disk memory location based upon the disk array and disk drive status information and current disk parameters;
   (c) determining whether the disk array is in the process of carrying out disk operations, and if carrying out such operations, suspending operation of the method of the present invention for a predetermined period of time and repeating these steps until disk operations are not being carried out;
   (d) generating a read request for the current disk memory location and queuing the read request for execution by the disk array controller;
   (e) checking the results of the read request to determine if the read request has failed and upon detection of a failure, indicating the disk media failure for the current disk memory location;
   (f) incrementing to a successive disk memory location; and
   (g) continuously performing steps (c) through (f) for all disk memory locations for all disks located within the disk array.

6. The method of claim 5, wherein the step of initializing disk memory location further includes determining if the computer system has been reset and if having been reset, initializing the current disk memory location to a predetermined disk memory location within the disk array.

7. The method of claim 5 wherein the step of determining if the disk array is active further includes determining if the disk array controller has received but not acted upon a input or output operation request.

8. The method of claim 7, wherein the step of determining whether the disk array is active further includes determining whether the disk on which the current disk memory location is located is currently being regenerated.

9. The method of claim 5, wherein the step of determining disk and disk array parameters further includes reading disk and disk array parameter information from a reserved disk memory location of a disk.

* * * * *